Aug. 23, 1938.     J. W. DAWSON     2,128,080
TIMING DEVICE
Filed Nov. 5, 1935     4 Sheets-Sheet 1

WITNESSES:
INVENTOR
John W. Dawson.
ATTORNEY

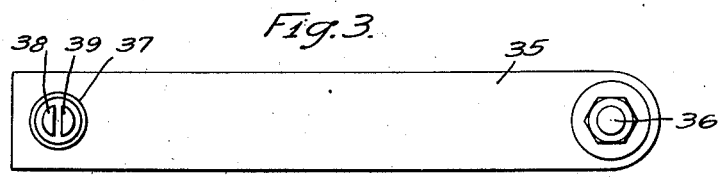
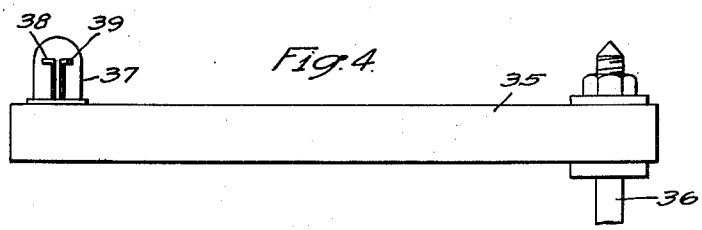
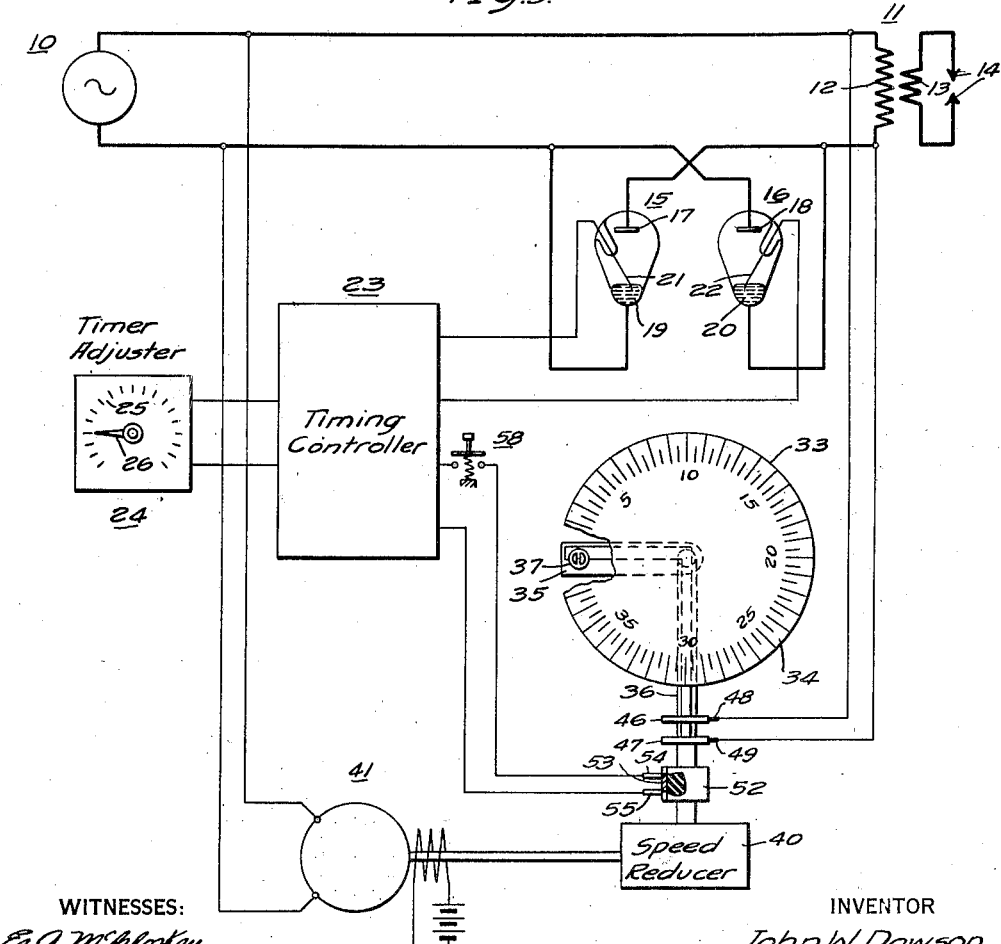

Aug. 23, 1938. J. W. DAWSON 2,128,080
TIMING DEVICE
Filed Nov. 5, 1935 4 Sheets-Sheet 3
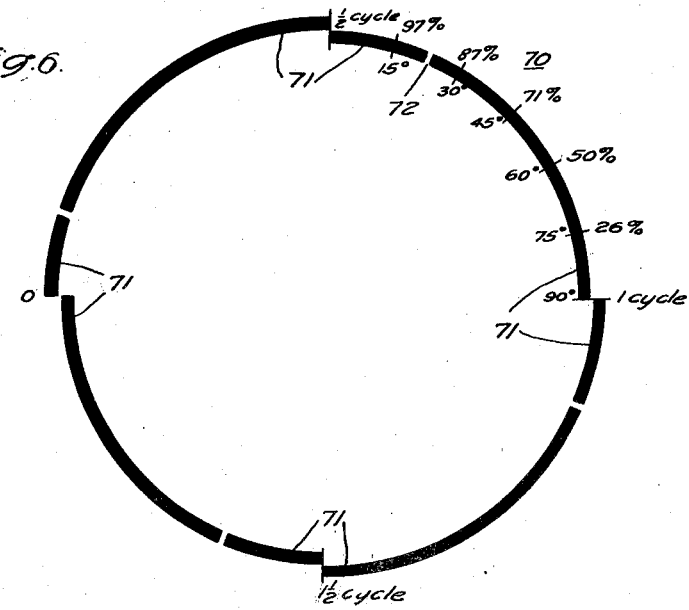
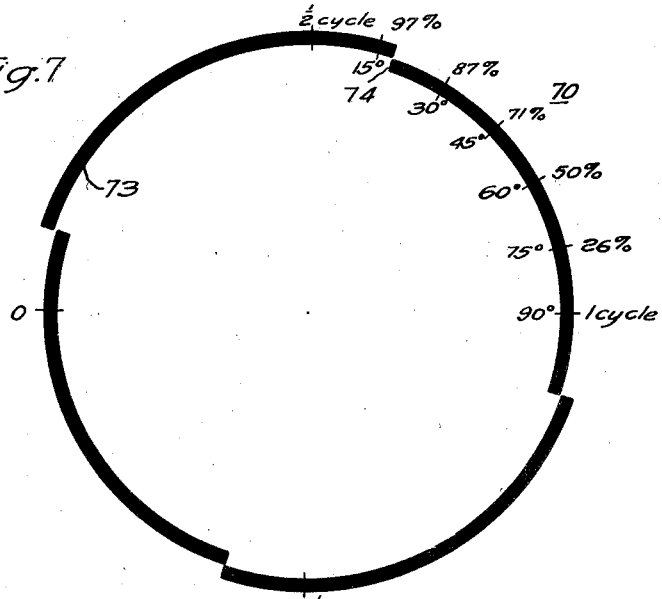
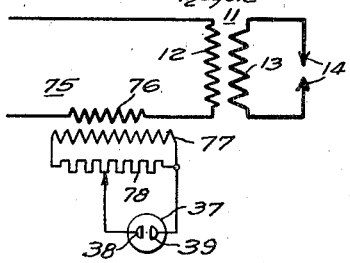
WITNESSES:
E. A. McCloskey
R R Lockwood
INVENTOR
John W. Dawson.
BY
M. Crawford
ATTORNEY Aug. 23, 1938.   J. W. DAWSON   2,128,080
TIMING DEVICE
Filed Nov. 5, 1935   4 Sheets-Sheet 4

WITNESSES:
E. A. M'Closkey.
R R Lockwood

INVENTOR
John W. Dawson.
BY
M Crawford
ATTORNEY

Patented Aug. 23, 1938

2,128,080

UNITED STATES PATENT OFFICE 2,128,080

TIMING DEVICE

John W. Dawson, East McKeesport, Pa., assignor to Westinghouse Electric & Manufacturing Company, East Pittsburgh, Pa., a corporation of Pennsylvania Application November 5, 1935, Serial No. 48,323

4 Claims. (Cl. 172—245)

My invention relates, generally, to electric measuring devices, and it has particular relation to devices for indicating the number of cycles of alternating current flowing to a load device.

In certain applications, it is desirable to use a predetermined number of cycles or half-cycles of alternating current for performing certain desired operations. For example, in the taking of X-ray pictures, it is desirable to apply alternating current for a short time as measured by a few cycles. In performing spot welding operations, it is also desirable to measure out or pass to the work being welded through welding electrodes a predetermined number of cycles or half-cycles of alternating current. In these and other applications it is desirable that only a predetermined number of cycles or half-cycles of the alternating current be permitted to flow and that this number not be departed from in performing successive operations.

In view of the accurate timing which is required for these applications, it is essential that some means be provided which will measure out the desired number of cycles or half-cycles. In order to make the application of these measuring devices universal they must be adjustable over a relatively wide range, that is, for example, they must be capable of being adjusted to supply from one to 30 cycles in half-cycle increments or portions thereof. Since the time required to pass, for example, one cycle of 60-cycle current requires only $\frac{1}{60}$ of a second, it is obvious that ordinary timing devices cannot be employed for measuring this extremely small increment of time. However, it is desirable to provide some means for accurately calibrating the devices which are used to control the flow of current to the load devices so that they may be adjusted with a minimum of delay and expense.

In the prior art, in order to measure the number of cycles or half-cycles which flow to a load device for the purpose of calibrating the control apparatus, ballistic galvanometers and electromagnetic cycle counters have been employed. These devices, however, are somewhat inaccurate since it is not readily possible to synchronize the time of application of the flow of current to the load device with these measuring devices, and further, the degree of accuracy which is required cannot inherently be obtained in such devices. An oscillograph may be used to obtain a record of the number of cycles which are supplied to the load devices for any particular setting of the control apparatus, but this means is relatively expensive and slow in operation and does not lend itself readily to test floor work or measurements in the field.

The object of my invention, generally stated, is to provide a calibrating device for indicating the number of cycles or half-cycles of alternating current flowing to a load device, which shall be simple and efficient in operation, and which may be readily and economically manufactured and installed.

The principal object of my invention is to provide for visually indicating the number of cycles or half-cycles of alternating current which are passed to a load device.

An important object of my invention is to provide for indicating on a scale the number of cycles or half-cycles of alternating-current which are passed to a load device and initiating the flow of current to the load device at a predetermined point on the scale.

Another object of my invention is to provide for rotating relatively to a scale a glow discharge device synchronously with the frequency of an alternating-current source connected to a load device, and energizing the glow discharge device on flow of current to the load device.

Still another object of my invention is to provide for rotating relatively to a scale a glow discharge device synchronously with the frequency of an alternating-current source connected to a load device, initiating the flow of current to the load device when the glow discharge device is at a predetermined position relative to the scale and energizing the glow discharge device on flow of current to the load device.

Other objects of my invention will, in part, be obvious and, in part, appear hereinafter.

Accordingly, my invention is disclosed in the embodiment hereof shown in the accompanying drawings, and comprises the features of construction, combination of elements, and arrangement of parts, which will be exemplified in the constructions hereinafter set forth, and the scope of the application of which will be indicated in the appended claims.

For a more complete understanding of the nature and scope of my invention, reference may be had to the following detailed description, taken in connection with the accompanying drawings, in which:

Figs. 3 and 4 are respectively views in top plan and side elevation of an operating arm;

Figure 9:
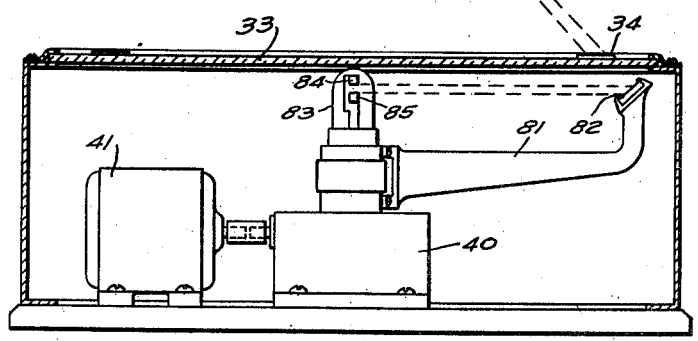
Figure 10:
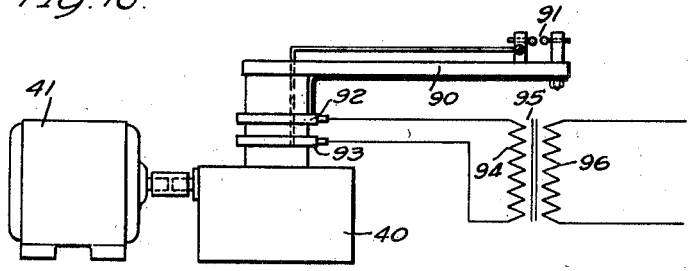

Fig. 5 diagrammatically represents the connections which may be employed in using the herein described calibrating device for calibrating a welding control system;

Figs. 6 and 7 illustrate modified forms of indications and scale markings;

Fig. 8 illustrates diagrammatically the circuit connections which may be used in order to obtain the indication shown in Fig. 7; and Figs. 9 and 10 show additional modifications of the calibrating device which may be employed without departing from the scope of my invention.

In the calibrating device described herein, I have provided a circular scale which may be calibrated in whole and half-cycle divisions. Underneath the scale is mounted an arm which may be rotated by means of a synchronous motor that may be energized from an alternating-current source, which is connected to supply current to a load device through a control mechanism which is to be calibrated to permit the flow of different predetermined numbers of cycles or half-cycles of the alternating current. Mounted on the rotatable arm directly underneath the circular scale is a gas-filled tube, or glow discharge device, the electrodes of which are positioned along the radius of rotation of the arm. The glow discharge device is arranged to be connected across the terminals of the load device so that it will be illuminated only when current flows to the load device. A commutator is provided which also rotates with the arm and is arranged to be connected in the control circuit for the timing controller so that the flow of current may be initiated to the load device when the arm is at a predetermined position, for example, at the zero position, relative to the circular scale.

In calibrating the timing controller, the timer adjuster is set on any unmarked portion of its scale and the calibrating device is connected into the system. A control switch, associated with the calibrating device, is operated and when the commutator reaches the position which corresponds to the zero point on the circular scale, current is caused to flow to the load device. At the same time, the glow discharge device is illuminated and continues to be illuminated as long as current flows to the load device. This time may be for a duration of one or more cycles, depending upon the setting of the timer adjuster.

The number of cycles which are passed to the load device is indicated on the circular scale by the successive flashes of the glow discharge device for each half-cycle passed. Due to the persistency of vision, an indication somewhat in the form of flat-topped waves will be provided on the circular scale. This indication will exist for a sufficiently long period to permit the operator to observe the scale marking at which the glow discharge device was no longer illuminated. This scale marking represents the number of cycles which were passed corresponding to the setting of the timer adjuster and this setting may be correspondingly recorded.

Since the electrodes of the glow discharge device are mounted along the radius of rotation of the arm carrying it, the flat-topped wave indication will result. This is due to the fact that the electrodes of the glow discharge device function alternately as cathodes during each successive half cycle, and as a result, the glow is transferred from one to the other. This phenomenon readily permits the initial setting of the arm relative to the commutator so that the current flow may be initiated at the zero point of the scale, and also permits the operator to observe the flow of current in half-cycle increments.

In a modification of the device, a plurality of glow discharge devices are stationarily mounted underneath a disc which is arranged to be rotated by means of a synchronous motor. The disc is provided with an aperture directly underneath the circular scale. During the time when current is flowing to the load device, the glow discharge devices will be illuminated and, due to the retentivity of the eye, the operator will observe a circular flash along the scale of a length depending upon the time during which current is passed to the load device.

Referring now particularly to Fig. 5 of the drawings, the reference character 10 designates, generally, an alternating-current source, such as a 60-cycle generator which is arranged to be connected to a load device that may comprise the welding transformer 11, of a spot welder, having a primary winding 12 for connection to the generator 10 and a secondary winding 13 for connection to welding electrodes 14. In order to control the flow of current to the transformer 11, arc discharge devices or "Ignitrons" 15 and 16 are oppositely connected in one of the conductors connecting the source 10 to the primary winding 12, as illustrated. The devices 15 and 16 are, respectively, provided with anodes 17—18, mercury pool cathodes 19—20 and starter electrodes 21—22. The devices 15 and 16 are adapted to be conducting during successive half-cycles, provided that a cathode spot is formed on the cathodes 19 and 20 during the half-cycle for which the respective devices are adapted to be conducting. In order to cause the formation of the cathode spots current is caused to flow through the starter electrodes 21 and 22 at, for example, the beginning of each of the half-cycles for which the devices are adapted to be conducting. When once rendered conducting, they will continue to remain in the conducting state until the end of the half-cycle.

For the purpose of controlling the arc discharge devices 15 and 16, a timing controller, shown generally at 23, is provided. The adjustment of the timing controller may be varied by means of a timer adjuster, shown generally at 24, which may comprise a variable impedance device for obtaining different numbers of cycles or half-cycles of alternating current. The timer adjuster 24 is provided with a graduated scale 25 with which a pointer 26 cooperates. It is to provide for calibrating the scale 25 that this invention is applicable.

Since the circuit connections of the timing controller 23 and the timer adjuster 24 form no part of this invention, they are shown in schematic form only. An example of the connections which may be employed in these devices is set forth in my copending application Serial No. 4,321, filed January 31, 1935, and assigned to the assignee of this application. It will be understood that the circuit connections shown in my copending application are referred to merely for illustrative purposes, and that various other control systems for the devices 15 and 16, now well known to those skilled in the art, may be employed, and that the calibrating device described herein may be used for calibrating them.

Figure 1:
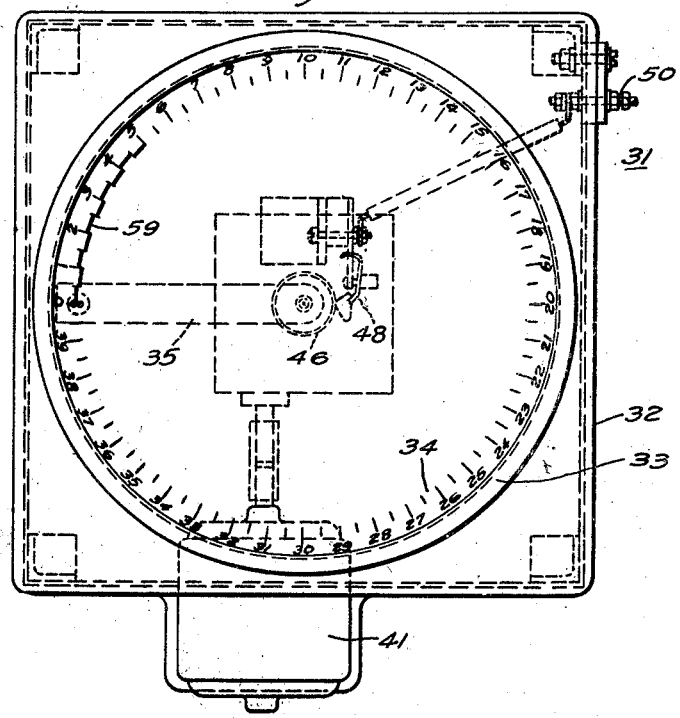
Figure 1 is a view, in front elevation, of a calibrating device constructed in accordance with my invention.
Figure 2:
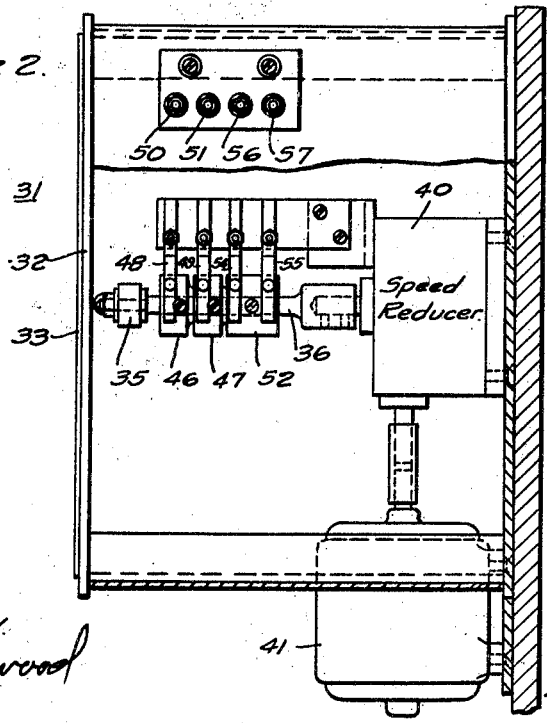
Fig. 2 is a view in side elevation of the calibrating device shown in Fig. 1, a cover being removed for the purpose of more clearly showing the internal construction of the device.

Referring now particularly to Figs. 1 and 2 of the drawings, the calibrating device which may be employed for calibrating the timer adjuster 24, shown in Fig. 5, is illustrated. This device is shown generally at 31 and comprises a frame 32 on which is mounted a plate 33 of light transmitting material, such as glass, on which a circular scale 34 is marked. As shown, the scale 34 is graduated in whole and half divisions up to 40, and these divisions represent whole and half-cycles of alternating current which may be passed to a load device, such as the welding transformer 11 described hereinbefore. It will be understood that a greater or lesser number of markings may be employed and that different spacings may be used as may be desired. In practice, however, I have found that a device which is capable of measuring up to 40 cycles around the entire circumference of the scale is satisfactory.

Mounted underneath the scale 34 is an arm 35 which is mounted for rotation on a shaft 36. As is more clearly shown in Figs. 3 and 4 of the drawings, the arm 35 has mounted at the outer end thereof a glow discharge device 37 provided with electrodes 38 and 39. The glow discharge device 37 may comprise a tube filled with a gas, such as neon, which will glow when a potential is applied across the electrodes 38 and 39. Depending upon the polarity of the potential which is applied to the electrodes 38 and 39, one or the other of them will glow, depending upon which is the cathode. Thus, if the electrodes 38 and 39 are connected for energization to the alternating-current source 10, they will successively glow during successive half-cycles. Advantage is taken of this phenomenon by arranging the electrodes 38 and 39 along the radius of rotation of the arm 35 for a purpose which will be set forth hereinafter.

Referring again to Figs. 1 and 2 of the drawings, it will be observed that the shaft 36 is driven through a speed reduction mechanism 40 by means of a motor 41 which is preferably a synchronous motor, and which, when connected for energization to the alternating-current source 10, will rotate the arm 35 at a fixed speed relative to or in synchronism with the frequency of the alternating-current source 10.

In order to connect the glow discharge device 37 for energization when current is caused to flow to the load devices, slip rings 46 and 47 may be connected to the electrodes 38 and 39, respectively, and brushes or contact fingers 48 and 49 are provided for connection thereto. The contact fingers 48 and 49 may be connected respectively to terminals 50 and 51 by means of suitable conductors, as illustrated in Figs. 1 and 2 of the drawings.

In order to initiate the flow of current to the load device 11 when the arm 35 is at the zero point of the scale 34, a commutator 52 is provided. As shown more clearly in Fig. 5 of the drawings, the commutator 52 comprises a cylindrical insulating member mounted on the shaft 36 and is provided with a contact segment 53 which is arranged to bridge brushes or contact fingers 54 and 55, at the time when the arm 35 or the glow discharge device 37 is positioned at the zero point of the scale 34. The contact fingers 54 and 55 may be connected to terminals 56 and 57 by suitable conductors and these terminals, in turn, may be connected through a control switch 58 into the control circuits of the timing controller 23.

In order to employ the herein-described calibrating device for calibrating the timer adjuster 24 of the timing controller 23, the terminals 50 and 51 which are connected to the brushes 48 and 49 may be connected across the terminals of the primary winding 12, as indicated in Fig. 5 of the drawings. Any other suitable connections may be employed which will cause the glow discharge device 37 to be energized during the interval of time when current is caused to flow to the load device 11. The remaining terminals 56 and 57 which are connected to the brushes 54 and 55 are connected through the control switch 58 into the timing controller 23 in such manner that the arc discharge devices 15 and 16 will be caused to become conducting at the time when the glow discharge device 37 is at the zero point of the scale 34. Thus, the foregoing described connections may be made and when the operator depresses the control switch 58, the arc discharge devices 15 and 16 will be rendered conducting at the time when the brushes 54 and 55 are bridged by the contact segment 53. The arc discharge devices 15 and 16 will remain in the conducting state for a time depending upon the setting of the timer adjuster 24. The number of cycles or half-cycles which are conducted for the particular setting will be indicated on the scale 34 and a corresponding calibration may be provided for the scale 25 of the timer adjuster 24.

Due to the fact that the electrodes 38 and 39 are positioned along the radius of rotation of the arm 35 during successive half cycles of the alternating current, the glow will shift from one to the other electrode, so that a zig-zag or flat-topped wave will appear, as at 59 on the scale 34. The speed of rotation of the arm 35 and the distance between successive divisions of the scale 34 are so correlated that each half-cycle flash will occur between successive divisions of the scale 34. Since the end of each half-cycle is distinctly marked by the shifting of the glow from one of the electrodes of the glow discharge device 37 to the other, it is possible not only to readily set the contact segment 53 of the commutator 52 initially at the zero position relative to the arm 35, but it is possible to more readily observe the number of half-cycles which are passed to the load device 11.

It will be understood that the pointer 26 of the timer adjuster 24 may be positioned at different points along the scale 25 and that the number of cycles or half-cycles passed corresponding to this position may be visually indicated on the scale 34. It is thus possible to very accurately and quickly calibrate the scale 25 of the timer adjuster 24.

Referring now particularly to Fig. 6 of the drawings, it will be observed that a modified form of indication and scale marking 70 is there illustrated. In this modification of the invention the motor 41 is arranged to rotate the arm 35 at a speed of 1800 revolutions per minute, or one revolution for each 2 cycles of a 60-cycle alternating current. Thus, the scale 70 may be calibrated beginning at the zero point every 90° with markings corresponding to one-half cycle.

When the space discharge device 37 is connected, as illustrated in Fig. 5 of the drawings, the flash which occurs on the scale 70 is illustrated by the heavy black line 71. Due to the change in polarity at the half cycle mark the polarity applied to the electrodes 38 and 39 will be reversed and the glow will shift, as indicated. Since the power factor of the circuit is lagging because the welding circuit constitutes an inductive load, the current zero lags to a corresponding extent the zero point of the voltage wave, so that at 72 a slight break may be observed in the flash 71. This break is due to the characteristic of the arc discharge devices 15 and 16 in requiring a certain time, although extremely short, to again be rendered conducting. Due to the high speed of rotation of the glow discharge device 37, this break 72 is magnified to such an extent that it may be more readily observed than is possible when the calibration shown in Fig. 1 is used. Advantage may be taken of the occurrence of the break 72 to provide a calibration of the scale 70 between the one half cycle and the one cycle mark, for example, either in percent power factor, or degrees, as indicated. The position of the break 72 as measured from the half-cycle mark, is a function of the power factor of the system, and it will, therefore, be evident that the calibrating device may be employed not only to count the number of cycles which pass to the load device, but also may be employed to give an indication of the power factor of the system. In the event that it is desired to have a continuous indication of the power factor of the system, the calibrating device may be permanently connected into the system, so that at all times, an indication of the power factor of the system will be had and may be obtained merely by observing the point on the scale 70 at which the break 72 occurs.

An indication of the power factor of the system may also be obtained by connecting the glow discharge device 37 so that it will be energized in response to the flow of current to the transformer 11, rather than in response to the voltage which is applied to it, as illustrated in Fig. 5 of the drawings. An indication such as that shown in Fig. 7 will then be obtained. It will be observed that in this figure the scale 70 is employed which is the same as that illustrated in Fig. 6 of the drawings. However, due to the fact that the glow discharge device 37 is energized solely in response to the flow of current, the flash 73 will continue and transfer from one electrode to the other when the current wave passes through zero. Since the zero point of the scale 70 may be set with respect to the operation of the system at unity power factor, then the time at which the glow of the electrodes 38 and 39 changes from one to the other, due to a reversal in polarity applied thereto, will give an indication, as at 74, of the power factor of the system.

In order to connect the glow discharge device 37 to be responsive to the flow of current only, a current transformer 75 shown in Fig. 8 of the drawings, may be provided having a primary winding 76 connected in series circuit relation with the primary winding 12 of the transformer 11. The current transformer 75 is provided with a secondary winding 77 having a fixed load comprising a resistor 78 connected across it. The glow discharge device 37 may then be connected as illustrated, through a variable connection to the resistor 78 to obtain the desired voltage therefor. It will be understood that the glow discharge device 37 of Fig. 8 may be connected through suitable slip rings and brushes, as illustrated in Fig. 5 of the drawings.

A modified form of the calibrating device is illustrated in Fig. 9 of the drawings. As there shown, the motor 41 is arranged to rotate through the speed reducer 40 an arm 81 carrying at the outer extremity thereof, an angularly disposed mirror 82, which is arranged to reflect the light from a glow discharge device 83, having electrodes 84 and 85, to the eye 86 of an observer. The observer will note the flash on the scale 34, for example, and will obtain an indication similar to that illustrated in Fig. 1 of the drawings. It will be observed that the glow discharge device 83 is stationarily mounted having the electrodes 84 and 85 positioned one above the other, in a manner extending through the axis of rotation of the arm 81.

A still further modification of the invention is illustrated in Fig. 10 of the drawings, in which the motor 41 is arranged to rotate, through the speed reducer 40, an arm 90 carrying a spark gap 91. The electrodes of the spark gap 91 may be connected to slip rings 92 and 93, which are, in turn, connected by suitable brushes to the secondary winding 94 of a high voltage transformer 95 having a primary winding 96 connected either across the terminals of the primary winding 12 of the welding transformer, or across the resistor 78, as illustrated in Fig. 8 of the drawings. The discharge of the spark gap 91 relative to a suitably placed scale will give an indication similar to that illustrated and described hereinbefore, which will permit the calibration of the timing controller and also will provide an indication of the power factor of the system.

In Figs. 9 and 10, the commutator 52 has been omitted but it will be understood that it may be provided, as desired, for initiating the operation of the system, as set forth hereinbefore, in connection with either of these modifications of the invention.

Since certain further changes may be made in the foregoing constructions and different embodiments of the invention may be made without departing from the scope thereof, it is intended that all matter set forth in the foregoing description or shown in the accompanying drawings shall be interpreted as illustrative and not in a limiting sense.

I claim as my invention:

1. A device for providing an indication relative to the current passed to a load device from an alternating-current source comprising, in combination, a rotatable support, a motor having driving connection with said support and disposed to rotate it in synchronism with the frequency of said source, a scale fixedly mounted relative to said support, and a glow discharge device carried by said support, said glow discharge device having a pair of electrodes disposed to be connected for energization on flow of current to said load device, said electrodes being spaced along the radius of rotation of said support whereby successive half cycles of the alternating current are indicated on radially spaced successive portions of said scale.

2. In combination with an electrical energy consuming device and means including a timing device for energizing it from an alternating-current source for a desired number of cycles, means for indicating the number of such cycles including a rotatable member and means for rotating it at a speed proportional to the frequency of said source, a glow-discharge device eccentrically mounted on said rotatable member and means for energizing it only while said consuming device is energized, and means controlled by said rotatable member for controlling said timing device to energize said consuming device only when said glow-discharge device is at a predetermined point in its path of revolution.

3. In combination with an electrical energy consuming device and means including a timing device for energizing it from an alternating-current source for a desired number of cycles, means for indicating the number of such cycles including a rotatable member and means for rotating it at a speed proportional to the frequency of said source, a glow-discharge device eccentrically mounted on said rotatable member and means for energizing it only while said consuming device is energized, means controlled by said rotatable member for controlling said timing device to energize said consuming device only when said glow-discharge device is at a predetermined point in its path of revolution, and means controlled by said timing device for simultaneously deenergizing said consuming device and glow-discharge device.

4. In combination with an electrical energy consuming device and means including a timing device for energizing it from an alternating-current source for a desired number of cycles, means for indicating the number of such cycles including a rotatable member and means for rotating it at a speed proportional to the frequency of said source, a glow-discharge device eccentrically mounted on said rotatable member and means for energizing it only while said consuming device is energized, means controlled by said rotatable member for controlling said timing device to energize said consuming device only when said glow-discharge device is at a predetermined point in its path of revolution, and means controlled by said timing device for simultaneously deenergizing said consuming device and glow-discharge device, said discharge device having two electrodes spaced radially of the axis of rotation of said rotatable member.

JOHN W. DAWSON.